Sept. 12, 1944.　　　C. E. HEMMINGER　　　2,357,894
HYDROGENATION OF CARBON OXIDES
Filed Dec. 11, 1940
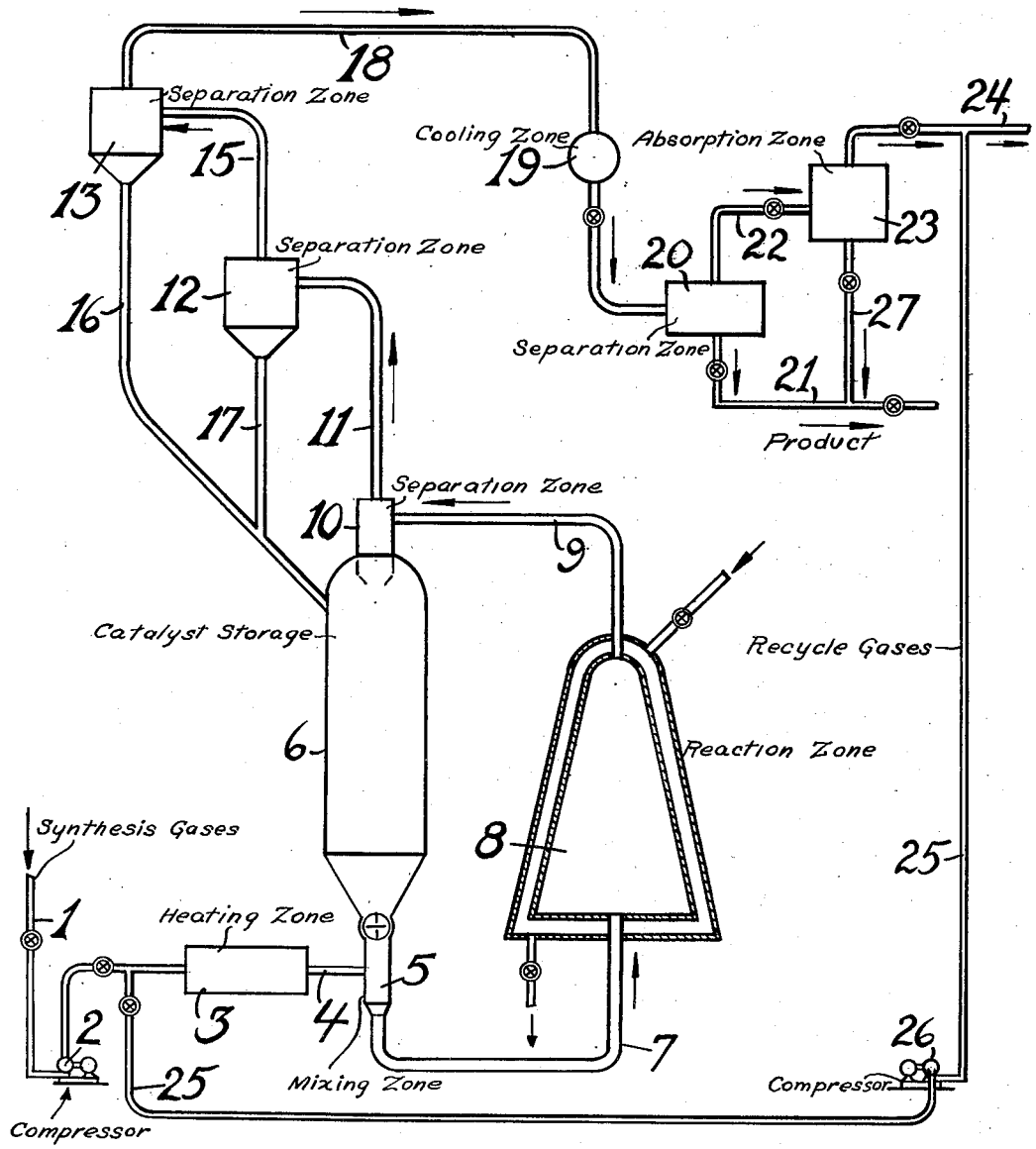
Charles E. Hemminger Inventor
By P. L. Young Attorney Patented Sept. 12, 1944

2,357,894

UNITED STATES PATENT OFFICE 2,357,894

HYDROGENATION OF CARBON OXIDES

Charles E. Hemminger, Westfield, N. J., assignor, by mesne assignments, to Standard Catalytic Company, a corporation of Delaware Application December 11, 1940, Serial No. 369,540

4 Claims. (Cl. 260—449.6)

The present invention relates to the manufacture of products by processes involving the interreaction of oxides of carbon and hydrogen resulting in the production of substances such as methanol and other alcohols, liquid hydrocarbons and oxyorganic compounds. The invention is more particularly concerned with the manufacture of valuable hydrocarbon products containing more than one carbon atom in the molecule by the hydrogenation of oxides of carbon. The invention is especially concerned with an improved method for controlling the reaction by adjusting the catalyst concentration with respect to the reaction gases as well as the velocity of the flowing gases through the reaction zone. In accordance with the present process the reaction is positively controlled by employing a suspended powdered catalyst under conditions in which the area of the reaction zone is decreased in the direction of flow of the reacting gases to compensate for the change in the volume of the flowing reaction gases in a manner to give the desired concentration of the powdered catalyst, and in a manner to produce a desired uniform velocity throughout the reaction zone. When operating in this manner the temperature throughout the reaction zone may be readily maintained substantially constant within the desired operating range.

It has been suggested to suspend a powdered catalyst in a feed gas mixture and to pass the mixture through a reaction zone under temperature and pressure conditions adapted to secure the desired reaction between the respective gases. While this type of operation is very satisfactory for most reactions, it does possess certain inherent disadvantages when conducting a reaction involving the interreaction of hydrogen and carbon oxides. This is due in part to the fact that there is a material decrease in the volume of gases in the direction of flow of the gases. This results in an unsatisfactory catalyst concentration with respect to the unreacted gases, lower velocities near the end of the reaction zone and also materially increases the difficulties of maintaining the temperature throughout the reaction zone within the critical operating temperature range.

When employing fixed beds of catalyst it is relatively easy to adjust the catalyst concentration with respect to the changing volume of flowing gases. It is also known to carry out various isothermic chemical reactions and to remove the heat of reaction by suitable means. These means usually comprise liquid cooling mediums which are circulated without or within the reaction zone. These methods of regulating the temperatures of the various processes while entirely satisfactory for most operations do have the disadvantage that the temperature is relatively difficult to control within the narrow range in operations of this character particularly when the cooling medium is circulated without the reaction zone. Furthermore, when the liquid cooling mediums are circulated within the reaction zone, there is a tendency to disturb the equilibrium conditions of the reaction and to impair the quality of the final products. These disadvantages are particularly aggravated in chemical reactions involving the hydrogenation of carbon oxides, as, for example, in the production of hydrocarbon constituents having more than one carbon atom in the molecule, since it is essential that the temperature in these reactions be controlled so that no substantial temperature variation during the course of the reaction occurs.

I have now discovered a method by which the above mentioned disadvantages are overcome. In accordance with my invention it is possible to accurately and positively control the catalyst concentration and to maintain the temperature of the reaction within the desired critical temperature range, thus materially increasing the yield and qualities of the desired products. In accordance with my invention applied to processes in which a suspended powdered catalyst is employed, the reaction gases are passed through a reaction zone the area of which becomes progressively smaller in the direction of flow of the reacting gases in a manner to compensate for the decreased volume of gases and to adjust the ratio of catalyst per volume of unreacted gases to the desired figure. By operating in this manner no temperature gradients result and undesirable side reactions are prevented.

The process of my invention may be readily understood by reference to the attached drawing illustrating modifications of the same. For purposes of illustration it is assumed that the feed gases comprise hydrogen and carbon monoxide, and that the reaction is conducted under conditions to produce hydrocarbon constituents containing more than one carbon atom in the molecule. The synthesis gases are introduced into the system by means of line 1, compressed in compressor 2, passed through heating zone 3 and introduced into mixing zone 5 by means of line 4. In mixing zone 5, heated gases are contacted with the desired amount of powdered catalyst which is withdrawn from catalyst storage zone 6. The heated gases containing suspended therein the powdered catalyst are withdrawn from mixing zone 5 by means of line 7 and introduced into reaction zone 8. Temperature and pressure conditions are adjusted in order to produce maximum yields of the desired products. The reaction gases along with the suspended powdered catalyst are withdrawn overhead from reaction zone 8 by means of line 9 and introduced into initial separation zone 10. Initial separation zone 10 may comprise any suitable means for removing the suspended catalyst from the reaction gases, as, for example, various types of cyclone separators. Substantially the entire quantity of the suspended catalyst is removed in separation zone 10 and passed to catalyst storage zone 6. The reaction gases, substantially free of the suspended catalyst, are withdrawn by means of line 11 and passed serially through separation zones 12 and 13 by means of lines 14 and 15 respectively. These zones comprise suitable means for substantially completely removing the remaining portion of the catalyst from the reaction gases. Catalyst is withdrawn from the respective zones by means of lines 16 and 17 and returned to catalyst storage zone 6. The reaction gases, substantially completely free of suspended catalyst, are withdrawn from separation zone 13 by means of line 18, passed to cooling or condensing zone 19 and introduced into separation zone 20. The condensate is withdrawn from zone 20 by means of line 21 while the uncondensed vapors are removed overhead by means of line 22 and passed through an oil absorption or equivalent operation in which desired hydrocarbon constituents are removed from the vaporous product. For the purposes of description it is assumed that the recovery system comprises an oil absorption recovery system 23. Uncondensed gases are removed from the oil absorption system by means of line 24 or may be recycled by means of line 25 preferably after being compressed by means of compressing unit 26. The liquid product is removed from absorption zone 23 by means of line 27 and preferably combined with the liquid condensate removed by means of line 21. The total condensate may be further refined or handled in any manner desirable.

The process of the present invention may be widely varied. The process essentially comprises passing the reaction gases through a reaction zone, the area of which is adjusted to compensate for the decrease in volume of the reaction gases whereby the gases are held within a relatively narrow critical temperature range and whereby the concentration of the catalyst with respect to the unreacted gases is adjusted to the desired ratio. Although the invention may be adapted to any process in which the volume of flowing gases decreases, it is particularly applicable in processes involving the hydrogenation of oxides of carbon conducted under conditions to produce hydrocarbon products containing more than one carbon atom in the molecule.

These reactions are generally conducted at a temperature in the range from about 330° F. to about 410° F. It is essential in order to secure satisfactory yields of the desired quality products that the temperature of the reaction not vary substantially from the predetermined operating temperature. In general, to secure satisfactory results it is essential that the temperature of the reaction in processes of this character not vary over a temperature range in excess of about 10° F., and preferably not vary over a temperature range in excess of 5° F. or less.

The catalyst employed is any suitable catalyst selected from the class of substances which are known as suitable catalysts for aiding the hydrogenation of oxides of carbon. Satisfactory catalysts are, for example, cerium, chromium, cobalt, manganese, barium, palladium, titanium, zinc, iron and oxides of these metals. Mixtures of these catalysts may be employed or the same impregnated with suitable agents adapted to increase their efficiency or strength. In general, in carrying out the present process, I have found it preferable to employ powdered catalysts of a mesh from about 200 to about 400.

The reaction zone of the present invention may be widely varied. In general, the reaction zone is adjusted so that the cross-sectional area of the same decreases in the direction of flow of the reaction gases in a manner to compensate for the decrease in volume of the reaction gases. The reaction zone may be any desirable length. However, in general, these zones are from about 2 feet to 10 feet in length. Furthermore, in accordance with the preferred modification of the invention, the diameter of the reaction zone at the point at which the reaction gases enter said zone is at least twice the diameter of the reaction zone at the point at which the reaction gases are withdrawn from the reaction zone.

When employing the present process, the ratio of powdered catalyst to unreacted gases gradually increases as these gases flow along through the reaction zone. By controlling the temperature under these conditions material improvements are secured.

The process of the present invention is not to be limited by any theory or mode of operation but only by the following claims.

I claim:

1. In a process in which the volume of reaction gases decreases in a reaction zone in the direction of flow of the reaction gases and wherein a suspended powdered catalyst is employed, the improvement which comprises passing the reaction gases through a reaction zone, the cross-sectional area of which decreases in the direction of flow of the reaction gases.

2. Process as defined by claim 1, in which the reaction gases comprise hydrogen and oxides of carbon, and in which temperature and pressure conditions are adjusted to produce hydrocarbon constituents containing more than one carbon atom in the molecule.

3. In a process in which the volume of reaction gases decreases in a reaction zone in the direction of flow of the reaction gases, and wherein the catalyst for the reaction is in a finely divided form and suspended in the reacting gases, the improvement which comprises passing the reaction gases through a reaction zone, the cross-sectional area of which decreases in the direction of flow of the reaction gases.

4. Improved process for the production of hydrocarbon constituents containing more than one carbon atom in the molecule, which comprises suspending a powdered catalyst in synthesis gases comprising hydrogen and oxides of carbon, passing the synthesis gases through a reaction zone, the cross-sectional area of which decreases in the direction of flow of the gases under temperature and pressure conditions, and in contact with the catalyst, adapted to react the hydrogen and oxides of carbon to produce reaction products containing more than one carbon atom in the molecule.

CHARLES E. HEMMINGER.